US008624730B2

(12) United States Patent
Chasko (10) Patent No.: US 8,624,730 B2
(45) Date of Patent: Jan. 7, 2014

(54) SYSTEMS FOR DETECTING, COLLECTING, COMMUNICATING, AND USING INFORMATION ABOUT ENVIRONMENTAL CONDITIONS AND OCCURRENCES

(75) Inventor: Stephen J. Chasko, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 394 days.

(21) Appl. No.: 12/942,449

(22) Filed: Nov. 9, 2010

(65) Prior Publication Data

US 2012/0112901 A1 May 10, 2012

(51) Int. Cl.
G08B 1/08 (2006.01)

(52) U.S. Cl.
USPC ............ 340/539.22; 340/539.26; 340/539.28; 340/517

(58) Field of Classification Search
USPC ......... 340/506, 517, 521, 522, 539.1, 539.17, 340/539.18, 539.22, 539.28, 541, 539.26; 370/254, 310.1, 310.2; 342/21, 146
See application file for complete search history.

(56) References Cited

U.S. PATENT DOCUMENTS

| | | | |
|---|---|---|---|
| 4,090,248 A * | 5/1978 | Swanson et al. | 714/48 |
| 5,155,468 A | 10/1992 | Stanley et al. | |
| 6,492,910 B1 | 12/2002 | Ragle et al. | |
| 7,522,063 B2 | 4/2009 | Ehlers | |
| 7,570,158 B2 | 8/2009 | Denny et al. | |
| 7,669,212 B2 | 2/2010 | Alao et al. | |
| 7,825,793 B1 | 11/2010 | Spillman et al. | |
| 7,839,289 B2 | 11/2010 | Chung et al. | |
| 8,253,553 B2 * | 8/2012 | Wedig et al. | 340/522 |
| 2003/0134598 A1 | 7/2003 | Sendrowicz | |
| 2006/0055529 A1 | 3/2006 | Ratiu et al. | |
| 2006/0125630 A1 | 6/2006 | Parkulo | |
| 2007/0263641 A1 | 11/2007 | Yee | |

(Continued)

FOREIGN PATENT DOCUMENTS

| | | |
|---|---|---|
| EP | 1571422 | 9/2005 |
| WO | 2007044445 | 4/2007 |

(Continued)

OTHER PUBLICATIONS

"International Search Report and Written Opinion, 13 pages", PCT/US2011/056866, Dec. 16, 2011.

(Continued)

*Primary Examiner* — Van T. Trieu
(74) *Attorney, Agent, or Firm* — Kilpatrick Townsend & Stockton LLP (57) ABSTRACT

Systems and methods are disclosed for identifying and providing warnings of tornadoes, hurricanes, earthquakes, and other environmental occurrences. Temperature, pressure, seismic activities and other environmental conditions are measured with improved granularity using sensors at multiple locations. More extensive distribution of sensors is enabled using existing networks, such as utility (e.g., gas and electricity) meter networks. Network traffic is improved by screening information locally so that only limited information is sent for central processing. A given location, for example, may compare its own and its neighbors measurements against a profile to identify the probable existence of a tornado before sending a message to a central processing device. Upon receiving such a message and possibly other information (e.g., other messages or weather service information), a central device may send notifications to specific facilities that an environmental occurrence may be occurring, for example, notifying specific residences in the expected path of a tornado.

22 Claims, 6 Drawing Sheets

(56) References Cited

U.S. PATENT DOCUMENTS

| 2008/0309486 | A1 | 12/2008 | McKenna et al. | |
| 2011/0066297 | A1 | 3/2011 | Saberi et al. | |
| 2011/0122798 | A1* | 5/2011 | Hughes et al. | 370/254 |
| 2011/0163905 | A1* | 7/2011 | Denis et al. | 342/21 |
| 2011/0241877 | A1* | 10/2011 | Wedig et al. | 340/540 |
| 2012/0025979 | A1* | 2/2012 | Monnerie et al. | 340/539.22 |

FOREIGN PATENT DOCUMENTS

| WO | 2007135233 | 11/2007 |
| WO | 2012015784 | 2/2012 |
| WO | 2012064474 | 5/2012 |

OTHER PUBLICATIONS

"International Search Report and Written Opinion, 15 pages", PCT/US2011/045286, Dec. 16, 2011.
PCTUS2011/045286, "International Preliminary Report on Patentability," Feb. 7, 2013, 11 pages.
U.S. Appl. No. 12/846,165; "Office Action," Apr. 19, 2013; 24 pages.
PCT/US2011/056866, "International Preliminary Report on Patentability", May 23, 2013, 9 pages.
U.S. Appl. No. 12/846,165, Final Office Action, mailed Sep. 6, 2013, 21 pages.

* cited by examiner

SYSTEMS FOR DETECTING, COLLECTING, COMMUNICATING, AND USING INFORMATION ABOUT ENVIRONMENTAL CONDITIONS AND OCCURRENCES

TECHNICAL FIELD

The embodiments disclosed herein relate generally to electronic devices and networks, and relate specifically to devices and systems used to detect tornadoes, hurricanes, earthquakes, precipitation, cloud cover, and other environmental occurrences and conditions.

BACKGROUND

Tornadoes, hurricanes, earthquakes, and other environmental occurrences can be difficult or impossible to predict, detect, and track using traditional weather sensing devices and systems. While radar and other types of weather sensing devices have been used to monitor weather conditions to identify indicia of such occurrences, such sensing techniques collect only limited information and thus have limited effectiveness in identifying such occurrences and their locations. For example, radar can be used to determine the probable occurrence of a tornado but generally fails to show a tornado's specific path. Radar data generally lacks sufficient granularity for such purposes.

In addition, since location-specific information about environmental occurrences such as tornadoes is generally not available, it can be difficult to specifically warn those in danger, i.e., those in an expected path of a tornado. Even if such specific location could be identified, sending targeted messages to such locations is generally impractical. Television and other broadcast media typically send generic information, i.e., information that is broadly applicable to an area, and are not well suited for sending warnings to small areas, e.g., individual neighborhoods, residences, and business. Generally, existing systems do not provide granular environmental sensing capabilities or location-specific warnings and notifications.

SUMMARY

Systems and methods are disclosed that provide more granular sensing ability for disaster and other environmental events. Improved granularity can be achieved by using many environmental sensors at multiple individual locations. The information collected by the sensors can be sent to a central location for processing or, preferably, preliminarily processed or screened at one or more of the sensor locations so that only some of the collected information is provided to the central processing location. A given location, for example, may compare its own environmental measurements with a profile to identify the probable existence of a particular environmental occurrence before sending a notification regarding the probable occurrence to the central processing location. Sending only a subset of the environmental information and/or summary notifications can reduce network traffic and allow a given network to handle more environmental sensing devices than it otherwise could.

Exemplary systems provide an environmental sensor and a transmission component at a facility, such as a residence or business. The environmental sensor generates data about an environmental condition such as the pressure, temperature, cloud cover, or seismic activity at the facility. The transmission component sends an environmental condition message relating to the data about the environmental condition for processing. In one exemplary system, the message is sent through an otherwise dedicated network such as a mesh network used to send utility (water, gas, electricity) measurements from the facility to a utility company.

An environmental condition message may be sent only upon certain conditions, for example, where it is determined that the environmental condition at the facility satisfies a profile for a type of environmental occurrence. As a specific example, such a message may be sent upon determining that pressure readings satisfy a particular profile, i.e., a tornado profile may be satisfied where pressure measurements fall within a particular range or indicate a change or acceleration in pressure over time.

An environmental condition message could be sent to a central facility for further processing. For example, upon receiving such a message and possibly considering other information (e.g., other messages, communications from a weather service, etc.), a central processing device may send notifications to specific facilities notifying those facilities that an environmental occurrence may be occurring or about to occur. For example, it may send notifications to specific residences that are determined to be in an expected path of a tornado, hurricane, or flood rush.

The processing of facility-specific environmental condition information can involve "teaming." In one example, such teaming involves a first device using its own information and information from a subset of the other sensor devices (e.g., its closest neighbors). An exemplary system provides a network allowing communication amongst environmental sensors at multiple facilities. A subset of the environmental sensors can share data about the environmental condition at their respective facilities and one or more of the facilities associated with that subset can send an environmental condition message relating to the shared data through the network to a central location. The message may be sent based upon a comparison of the shared data with a profile for a type of environmental occurrence.

Certain exemplary systems and methods further involve novel ways of using environmental condition information to recognize environmental occurrences and provide location-specific responses. One exemplary method involves receiving both environmental condition messages and utility messages over a network. The environmental condition message provides information relating to an environmental condition at a facility and the utility message provides information relating to measurements from a utility sensor at the facility. A probable environmental occurrence can then be identified using the information about the environmental condition, the utility measurements, and/or other information such as radar information from a weather information source. The information relating to the utility measurements may identify a power surge or outage that supports one or more particular environmental occurrences, e.g., lighting, tornado, etc.

In response to one or both of the environmental condition and utility messages, a central processing device may identify a probable environmental occurrence, such as a hurricane, and send notifications to facilities notifying that the probable environmental occurrence may be occurring or about to occur. In response to such notifications, the receiving facilities may warn their occupants and/or initiate or increase the measurement, recording, storage, or sending of information relating to the environmental condition, audio, or video.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE DRAWINGS

These and other features, aspects, and advantages of the present disclosure are better understood when the following Detailed Description is read with reference to the accompanying drawings, wherein.

DETAILED DESCRIPTION

Systems and methods disclosed herein provide more granular sensing ability for conditions used to identify tornadoes, hurricanes, earthquakes and other disaster events. Mechanism can also be used to team information for providing localized alerts and systemic management of localized alerts. One exemplary embodiment involves including sensors within a mesh-based network system such as an advanced metering infrastructure (AMI), radio-frequency (RF) network. Other embodiments can be implemented outside of an AMI system.

Figure 1:
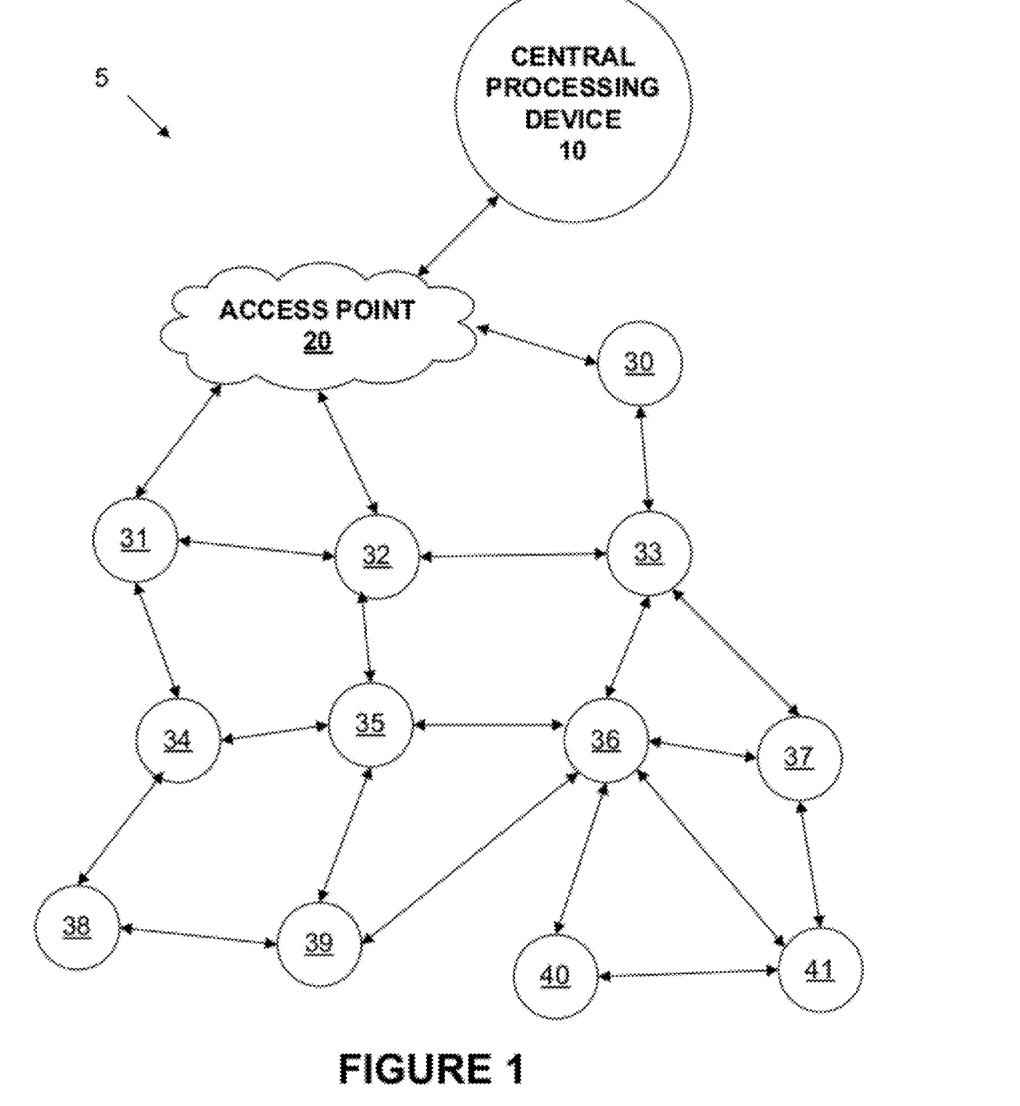
FIG. 1 is a system diagram illustrating an exemplary AMI-based, mesh network in which environmental condition sensors can be distributed.

FIG. 1 is a system diagram illustrating an exemplary AMI-based, mesh network in which environmental condition sensors can be distributed. Other embodiments may involve alternative networks and systems. The network 5 shown in FIG. 1 comprises a central processing device 10, an exemplary access point 20, and other devices, referred to herein as nodes 30-41. The nodes 30-41 work together to create a mesh network in which each node generally comprises a radio that can speak to and respond to neighboring radio devices of neighboring nodes. In the case of an AMI system, at least some of such nodes are at an endpoint and may comprise or connect to one or more endpoint devices such as a utility meter, appliance, environmental condition sensor, or analysis device. Other nodes may simply function as communication devices and thus may not themselves comprise or connect to an endpoint device.

Thus, generally, a node may interact with an endpoint device, act as part of the network, or both, and may do so simultaneously. The radio of each node may have a programmable logic controller (PLC)-like device. Such a device can enable the radio to function like a small computer, carrying out appropriate computing and command functions. Thus intelligence in some or all of the radios may be used to delegate and distribute commands throughout the network 5. The radio may, but need not necessarily, allow two-way communication.

As an example of a utility monitoring network, each node of network 5 that comprises or connects to an endpoint may collect information about utility consumption at that endpoint and send such information through the network 5 to an access point 20, where it may be collected by a utility company, for example, for billing and/or monitoring purposes. As a more specific example, an endpoint device radio may generate a packet of data that is transmitted to some destination, such as an access point destination. The packet may be addressed to the destination and entered into the network. The data packet traverses the network by hopping from radio to radio (node to node) in the direction of the destination-addressed radio. The route chosen for traversing the network may be dynamic and/or may employ routing. Generally, the network 5 will attempt to minimize the number of hops to increase transmission speed.

In the context of detecting, collecting, communicating, and using information about environmental conditions and occurrences, one or more of the endpoint nodes may collect or otherwise use environmental condition information, for example, using data from thermometers and other environmental condition sensors at the endpoint. Nodes may send messages related to the environmental condition information and or environmental occurrences to other nodes and/or to a central processing device 10 which is located at or accessible from exemplary access point 10. Conversely nodes may receive messages related to environmental condition information and or environmental occurrences. As a specific example, a node at an endpoint may receive a message indicating that there is a possible tornado or other environmental occurrence in the area of the node's endpoint, and cause an alarm or other warning device at the endpoint to display and/or sound a warning to occupants. Packets relating to environmental condition information and or environmental occurrences can be addressed and traverse the network in ways similar to those of utility-related messages previously described, or may be implemented differently. For example, some or all environmental condition information and or environmental occurrences messages may be sent with higher priority and thus traverse the network more rapidly than other types of messages. Integrity checks, signing, and/or encryption techniques may be used to ensure the confidentiality, integrity, authenticity, and/or otherwise secure the messages.

The radio and/or other components at a node of the network may be battery-powered, line-powered, or powered by any other suitable power source and attached via any suitable connection. Nodes will also generally comprise a time-keeping component such as a crystal oscillator.

Figure 2:
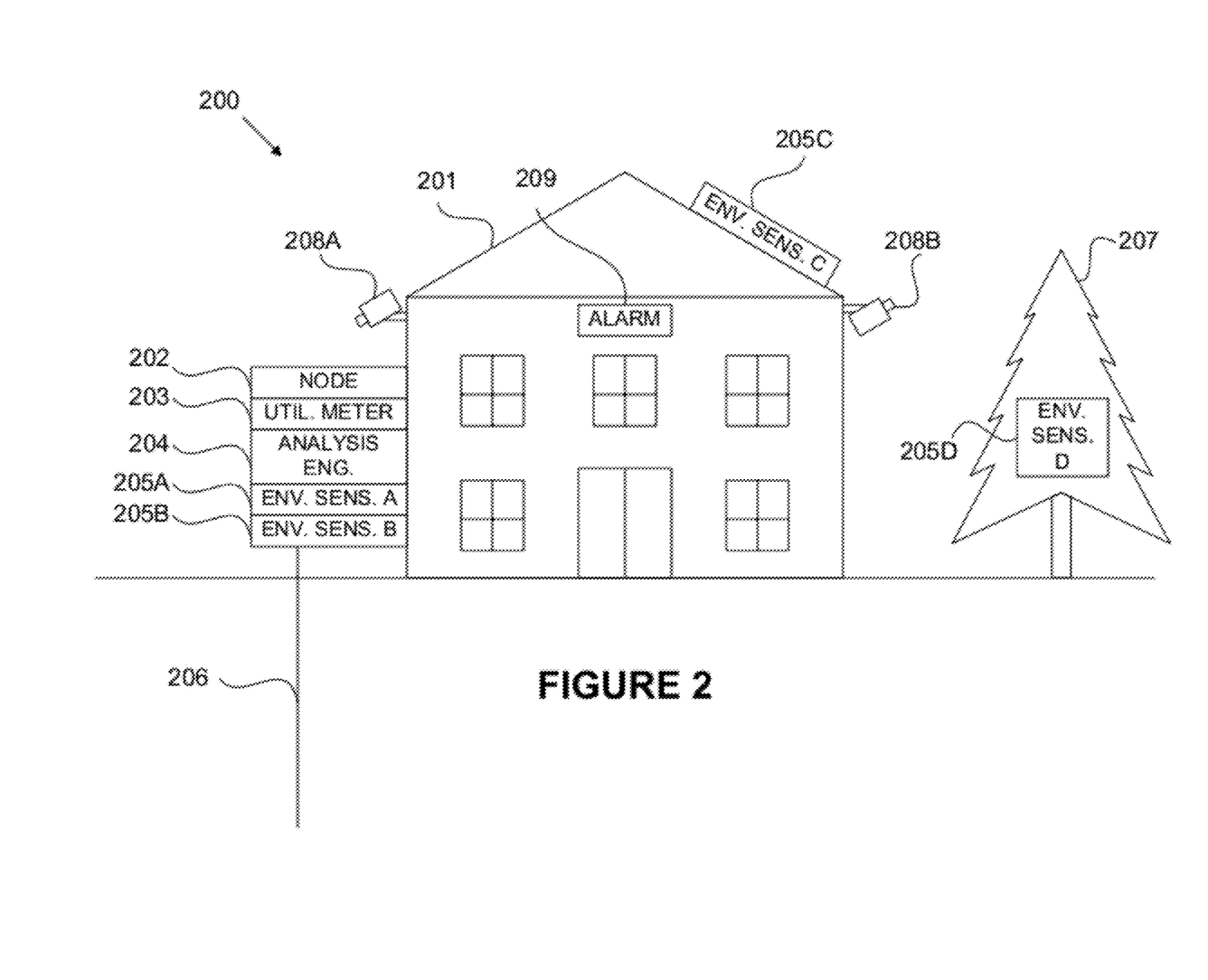
FIG. 2 is a system diagram illustrating an exemplary configuration of utility measuring, environmental condition sensing, and analysis devices at an endpoint facility at a node of the network of FIG. 1.

FIG. 2 is a system diagram illustrating an exemplary configuration of utility measuring, environmental condition sensing, and analysis devices at an endpoint facility at a node of the network of FIG. 1. Specifically, the endpoint facility includes system 200 of various devices distributed in or around house 201 and its surroundings including, but not limited to, tree 207. The system 200 includes a node 202, which may as an example be any one of nodes 30-41 of FIG. 1. The node 202 may include communications and other functionality. The system 200 further includes a utility meter 203, an analysis engine 204, and environmental condition sensors 205a-d. In this exemplary configuration, environmental condition sensor A 205b and environmental condition sensors B 205b are located in the same area of the endpoint facility as the node 202, the utility meter 203, and the analysis engine 204. Such components can be combined within a single device or provided in communication with one another through wire or wireless communication.

In one exemplary embodiment, the environmental condition sensors 205a-d send information to the analysis engine 204 through a wireless local area network (LAN). The analysis engine processes the information and causes messages to be sent from node 202 to neighboring nodes, which may include some or all of the other nodes 30-41 of FIG. 1, or directly or indirectly to central processing unit 10 of FIG. 1. In alternative embodiments, an analysis engine alternatively or additionally causes such messages to be sent over another network for similar purposes, for example, sending such messages over the Internet using an Internet connection available at the facility or using a power line carrier network available at the facility.

In FIG. 2, environmental condition sensor B 205b illustrates a sensor that includes a sensing component 206 that extends below ground level to sense an underground environmental condition such as underground water conditions, underground chemical presence or activity, or seismic activity. Environmental condition sensor C 205c is provided on a rooftop of the house 201 and is thus separate from other components of the system 200. Similarly, environmental condition sensor D 205d is located in tree 207.

The system 200 further includes recording devices 208a-b for recording image, audio, and/or video at the location of the facility. These recording devices 208a-b can be used as environmental condition sensors providing image, audio, and video data relevant to the environment. As a specific example, a camera device can provide images or video that can be interpreted to identify cloud cover, cloud movement, or sun conditions. The recording devices 208a-b may also or alternatively be used to record additional information. For example, such recording devices 208a-b may ordinarily be used as security surveillance but, upon a tornado, hurricane, or other environmental occurrence, may be controlled, e.g., aimed at the sky, to record the environmental occurrence.

The system 200 further includes an alarm 209 that can be used to warn or otherwise notify occupants when particular environmental conditions or occurrences are identified. For example, the alarm may broadcast a beeping sound, play a recorded audio warning, and display flashing lights and text when environmental conditions indicative of a tornado are identified at the endpoint or nearby. Such warnings can be triggered and/or controlled locally, for example, by analysis engine 204, or can be controlled based on messages received from remote locations, as examples, from nearby nodes 30-41 or central processing device 10 of FIG. 1.

Generally, one or more measuring devices can be included in endpoint devices of a network to measure environmental conditions. Such sensors may sense or measure seismic activity, air and/or water temperature, air pressure, light, humidity, rainfall or other precipitation, flood level, radiation level, pollen level, electricity, magnetism, gravity, and other environmental conditions and include devices that detect fire, sense particular chemicals, measure underground water and other underground conditions, detect the presence or quantity of cell phone and other electromagnetic signals, and devices that record data, images, audio, and/or video. Exemplary seismic detectors include an accelerometer, shock detector, and GPS devices. Sensors may perform such sensing continuously, at intervals over time, or otherwise as may be appropriate for the particular sensor and environmental condition being sensed.

Endpoint functionality can be consolidated in a singe device or separated in multiple devices, possibly at distributed locations at a facility. For example, in one exemplary embodiment a transmission device is used to connect to a mesh or other network and a separate processing device is used to analyze. Environmental sensor devices located at various locations at the facility separate from the transmission and processing devices, locally communicate with one or both of those devices to provide their data.

In one particular example, a house is equipped with an ecometer device that includes both a utility sensor for measuring the amount of a utility (e.g., water, gas, or electricity) consumed at a facility as well as one or more measurement devices that measure outside temperature, pressure, and other ecological or other environmental conditions. The ecometer communicates with a processing device via a wired or wireless LAN to provide its environmental condition measurements and other data. The processing device then analyzes this information and, when appropriate, communicates with the transmission device via the LAN so that the transmission device sends messages about the environmental condition through an AMI mesh network to neighboring facilities and/or to a central processing device.

An ecometer or other environmental condition sensor may be used for other purposes. For example, in addition to providing data for analysis and possible transmission through an AMI network for environmental occurrence identification purposes, such data may be provided locally at the facility. For example, information about temperature, pressure, rainfall, etc. may be provided on a display at a facility to inform the occupants of the facility of those conditions. In certain embodiments, a sensing device's primary purpose is to provide such information for occupant use and the device's capabilities are extended to also provide such information for analysis and possible transmission through an AMI network for environmental occurrence identification purposes. Existing environmental sensors may be configured for connection with an AMI system in a variety of appropriate ways depending on the particular device and AMI system components involved.

In other embodiments, a utility sensor and environmental sensors are separated from one another. For example, a temperature sensor may be placed at one location, a rain gauge at another location, and a utility meter device at a third location. Generally, the sensing, analyzing, and transmission functionalities performed at a facility can be performed by one or more devices configured and/or located at the facility as may be appropriate for the particular system and/or facility.

Environmental condition information from environmental condition sensors can be used in various ways. Such information can simply be forwarded to a central device for processing. However, depending upon the size of a network and the number of sensors such messages may impose an undesirable burden upon the network and/or the central processing device. An alternative is to only send aggregate and/or selected information to the central processing device.

Figure 3:
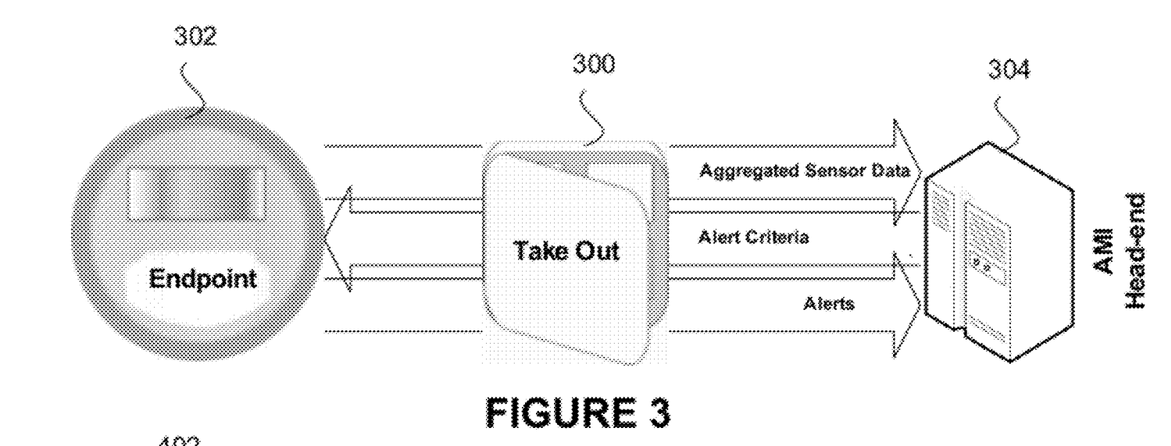
FIG. 3 is a flow diagram illustrating how a take out device can facilitate use of environmental condition data and alerts in an exemplary AMI-based network.

FIG. 3 is a flow diagram illustrating how a take out device can facilitate use of environmental condition data and alerts in an exemplary AMI network. In this example, the take out 300 receives and aggregates sensor data from one or more endpoints such as endpoint 302 and sends aggregated sensor data to an AMI head-end 304 which acts as or communicates with a central processing device to use and act upon such data. Similarly, the take out 300 receives and passes on alerts from one or more endpoints such as endpoint 302 to the AMI head-end 304 which acts as or communicates with a central processing device to use and act upon such alerts. The AMI head-end 304 may provide the endpoints criteria such as environmental occurrence profiles that the endpoints can use to determine whether to send an alert or not. For example, criteria may specify that when a particular low temperature is reached a freezing alert should be sent to the AMI head-end 304.

In one exemplary embodiment, one or more devices are provided at a facility that sense one or more environmental conditions and, based on such conditions, determine if and when to send information to either neighboring devices or to a central processing device. Endpoint devices in a mesh or other network can thus include a rules engine or other processing equipment that can process the measurements. Such devices may also provide functionality for teaming measurements and/or for performing alert and reporting functions. To determine if and when to send information, an endpoint device may analyze environmental condition information looking for specific values, patterns, trends, or otherwise compare such condition information against profiles of one or more environmental occurrence types (e.g., hurricane, tornado, earthquake, etc.) to identify when environmental conditions fit the profile and thus indicate that such an environmental event is occurring or about to occur. In a particular example, an endpoint device may compare pressure data, light data, and temperature data about current conditions at the facility of the device with a tornado profile. If the data matches the profile, the endpoint device may send a message to a neighboring device or a central processing device. Environmental conditions may be tracked over time so that the data provides information about how conditions are changing over time as may be applicable for a particular environmental occurrence profile.

Exemplary rules for processing environmental condition measurements and related information include, but are not limited to, rules specifying how often to perform the measurement, thresholds for increasing or decreasing measurement frequency, and security requirements for updating rules.

Certain exemplary systems and methods further involve novel ways of using more granular environmental condition information to recognize environmental occurrences. One exemplary method involves receiving both environmental condition messages and utility messages over a network. The environmental condition message provides information relating to an environmental condition at a facility and the utility message provides information relating to measurements from a utility sensor at the facility. A probable environmental occurrence can then be identified using the information about the environmental condition, the utility measurements, and/or other information such as radar information from a weather information source. The information relating to the utility measurements may identify a power surge or outage that supports one or more particular environmental occurrences, e.g., lighting, tornado, etc. Using radar plus pressure readings plus power lost information can be combined to provide a more accurate and granular understanding of environmental conditions and occurrences.

Figure 4:
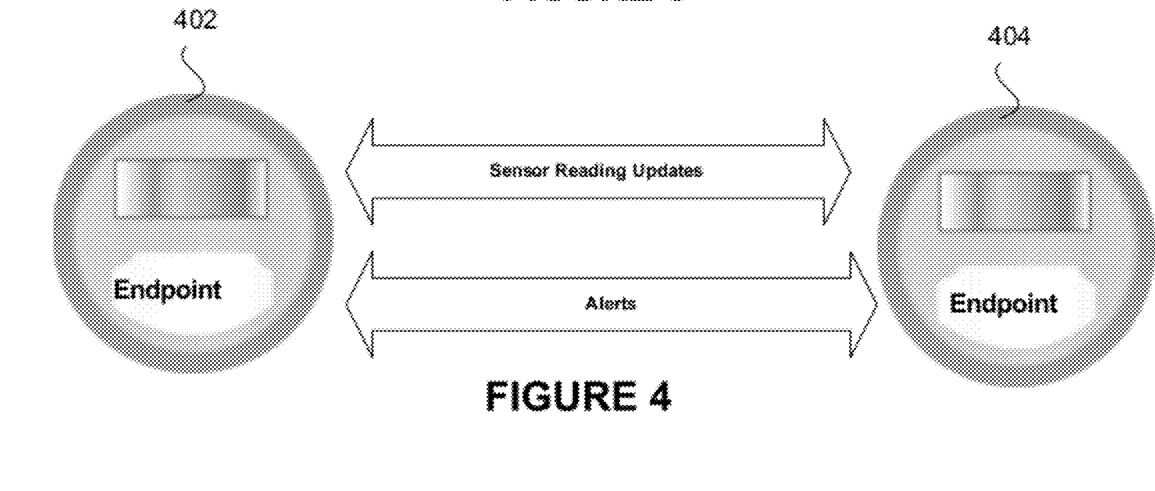
FIG. 4 is a flow diagram illustrating endpoints can share environmental condition data and alerts.

FIG. 4 is a flow diagram illustrating endpoints 402, 404 can share environmental condition data and alerts. Such sharing can provide various benefits including, but not limited to, improving the speed of alert distribution to improving the analysis of local environmental conditions at the nodes that are sharing information.

The selection of whether to send environmental condition measurements to a central processing device can also utilize teaming techniques. "Teaming" refers to using information from a subset or team of devices. In the context of selecting if and when to send information to the central processing device, teaming may involve a given facility receiving information from one or more of its neighboring facilities. For example, a processing device at a house may receive pressure and temperature measurements or messages from neighboring houses and use shared information to make a more informed analysis of the import of the weather conditions. For example, the device may see that the whole neighborhood is experiencing a pressure decrease, or that differences amongst neighboring measurements suggest a particular environmental occurrence. As a particular example, pressure differences and differences in wind direction may fit a profile for a hurricane. The use of teaming and profiling techniques can reduce the overall traffic on a given network. In certain scenarios such reduced traffic levels improve network efficiency.

Selection of clusters or teams can be done in any suitable manner. For example, teams can be selected at a head-end or other central device that can use coordinates (e.g., latitude and longitude) of devices known to select groups for teaming. A team can be defined on an ad hoc basis where a configurable parameter indicates how large a team will be. This can be geographically based (devices within 2 kilometers will be part of a device's team) or communications based (devices within 1 hop of the device will be part of a device's team). One device could be teamed with a predetermined number of its nearest neighbors or all of its neighbors within a predetermined distance, e.g., ¼ mile, ½ mile, 100 yards, etc.

Teaming can be implemented in various ways. A rule can specify the frequency for updating neighboring devices on measurements. Another teaming rule may specify how aggregated sensor data is sent to a central processing device, e.g., a head end in an AMI-based system. Environmental condition sensor data may not be needed on a real time basis. Accordingly, aggregation of data and scheduled updates can be configurable and managed to maintain availability of the communication system.

When local or locally-teamed environmental condition data fits an environmental occurrence profile, information can be sent to other facilities and/or to a central processing device through an AMI, mesh, or other network to notify those devices that the profile has been satisfied and accordingly suggest that the associated type of emergency event may be occurring or about to occur. The local facility may also be notified. A home area network (HAN), for example, may be used to communicate an alert message to an in-house display. As examples, remote and local alerts may be provided upon certain changes in pressure, temperature changes, light changes, humidity changes, and/or power outages associated with neighboring devices.

Certain environmental condition changes may be particularly significant including, as examples, measures that signify significant step changes, velocity of changes, and/or acceleration of changes in a localized area. In an exemplary embodiment, team members may communicate velocity or acceleration of measured data on a priority basis should the velocity/acceleration exceed configurable triggers.

Certain embodiments use system alert criteria that are based on similar rules, conditions, or other profile comparisons. These types of alerts can be used to provide remote tracking of weather events—such as tornadoes and hurricanes, seismic events, flooding or other incidents which are detectable by the sensor equipment.

Analysis of environmental condition data may trigger various actions. In the context of teaming, it may trigger a team member sending notification or other sensor-based information to the central location and may trigger the team member notifying the other members of its team that it has sent the information. This can reduce redundant and partially-redundant information. A triggering event can be any event that satisfies a profile such that a notification and/or information is sent to the central processing location. After such a triggering event, the system may increase the amount of information that is provided by some of its devices. For example, devices in a team associated with a possible tornado notification can be configured or adjusted to send more or all of their measurements to the central processing location following such a possible tornado notification.

Environmental conditions and related messages may be analyzed at a head end or other central processing device. In an exemplary system, a set of rules is used to determine an appropriate response. A central processing device may also communicate with other entities, i.e. weather service entities, to exchange information about weather conditions and occurrences. The response to information about weather conditions and occurrences can be automated, manual, or some combination of automated and manual.

Additionally or alternatively, upon a triggering event, one or more actions may be initiated through AMI, mesh, or other network. Notifications may be sent to particular ones of the facilities accessible through such a network based on the known locations of those facilities. In some circumstances, a central processing device may want more information and may thus send notifications or other messages that cause some devices to measure, record, and/or send more environmental condition data or otherwise change with respect to sensing frequency, data storage or sending policies, and/or initiate video recording, audio recording, or other particular actions at one or more facilities. In one specific example, video recorders or other sensing devices are activated to turn on or enhance recording of video and/or other information during a possible weather occurrence. A video surveillance system, separate from a metering network, may nonetheless be capable of receiving input from the dedicated metering network such that it responds to commands from the network to record and/or store video differently than it otherwise would. Video information could be recorded with or without sending the recorded video over the dedicated network or another network to the central location.

Certain systems can use an AMI, mesh, or other network to send location-targeted messages to warn or otherwise notify occupants of environmental occurrences that have been detected. For example, in the example in which a possible tornado notification is sent from one or a team of devices, a central processing location may respond by sending notification to devices in those devices, devices in surrounding locations, or devices in an anticipated path of an occurrence such that those devices display or otherwise warn occupants of the possible occurrence.

To implement one or more analysis and/or teaming features, a central device may include and maintain information about one or more of the locations of facilities and thus have unique identifies for such facilities, information about any environmental conditions sensors installed at such facilities, and/or security rules for the devices, as examples, with respect to confidentiality, availability, integrity rules. An exemplary implementation may use off-the-shelf cryptography for security. Generally, a baseline level of security mechanisms should preferably be in place for embodiments that use a teaming mechanism to help ensure the integrity and availability of the sensing data. Since some of the events are time critical (sending an alert), there may be times when cryptographic mechanisms are disabled. Exemplary mechanisms include, as examples, the signing of critical data, signing of configuration changes, and authentication codes on team data.

Figure 5:
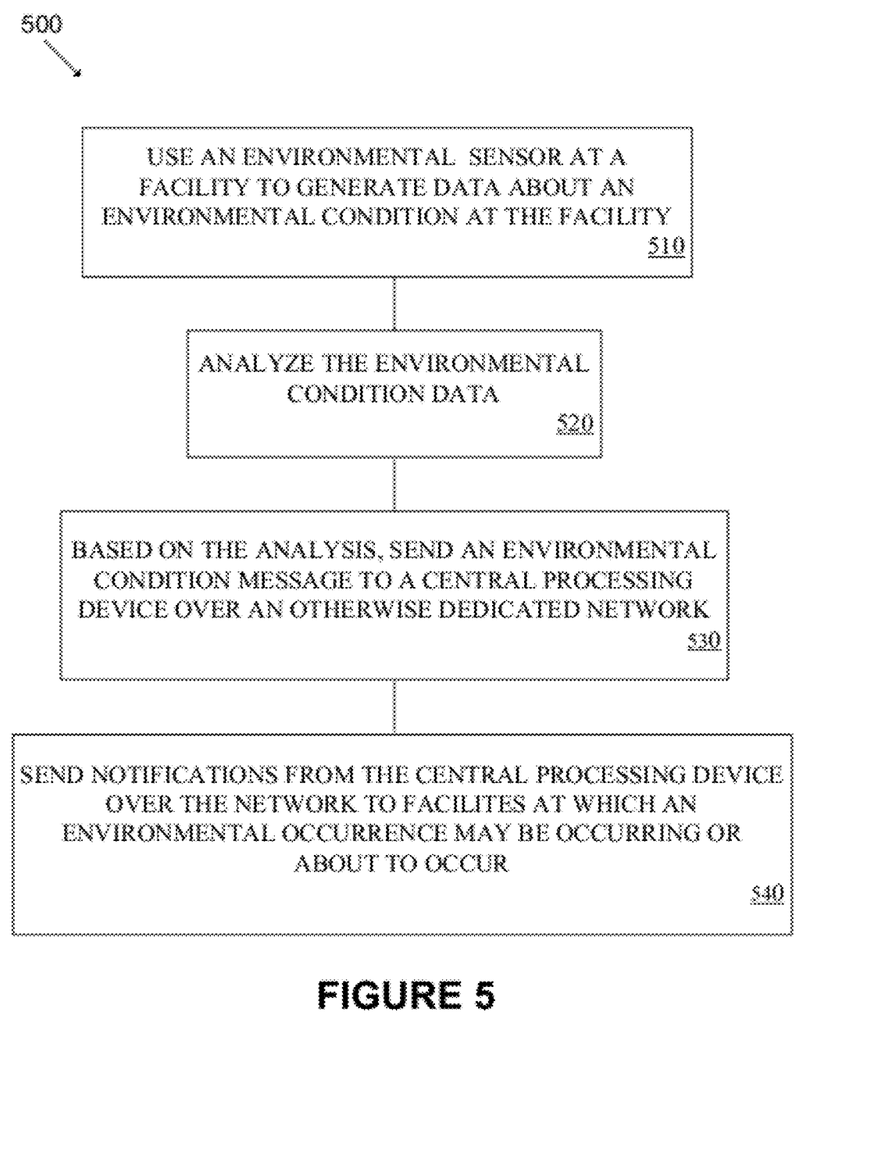
FIG. 5 is a flow diagram illustrating an exemplary method of sending environmental condition data on a mesh network that is also used for utility measurement messages.

FIG. 5 illustrates an exemplary method of sending environmental condition data on a mesh network that is also used for sending utility measurement messages. The exemplary method 500 comprises using an environmental sensor at a facility to generate data about an environmental condition at the facility, as shown in block 510.

The method 500 further comprises analyzing the environmental condition data at the facility, as shown in block 520. This may involve determining whether the environmental condition data satisfies a profile for a type of environmental occurrence. As a specific example, a comparison device at the facility may be used to compare the data about the environmental condition with the profile for a tornado or other particular type of environmental occurrence.

The method 500 further comprises sending an environmental condition message to a central processing device over an otherwise dedicated network, as shown in block 530. AMI-based and other mesh networks provide examples of otherwise dedicated networks. The environmental condition message relates to the data about the environmental condition at the facility and, for example, may indicate that the data satisfies a particular environmental condition profile. The mesh network may be used for other purposes and thus may comprise one or more nodes that receive and route utility measurement messages from facilities. Such measurement messages comprise information about measurements from utility sensors at the facilities.

The method 500 further comprises sending notifications from the central processing device to one or more of the facilities through the network notifying that an environmental occurrence may be occurring or about to occur, for example, at the one or more of the facilities to which the notifications are sent, as shown in block 540. In response to such notifications, an audible, visual, or other warning is provided to one or more occupants at the facility.

Figure 6:
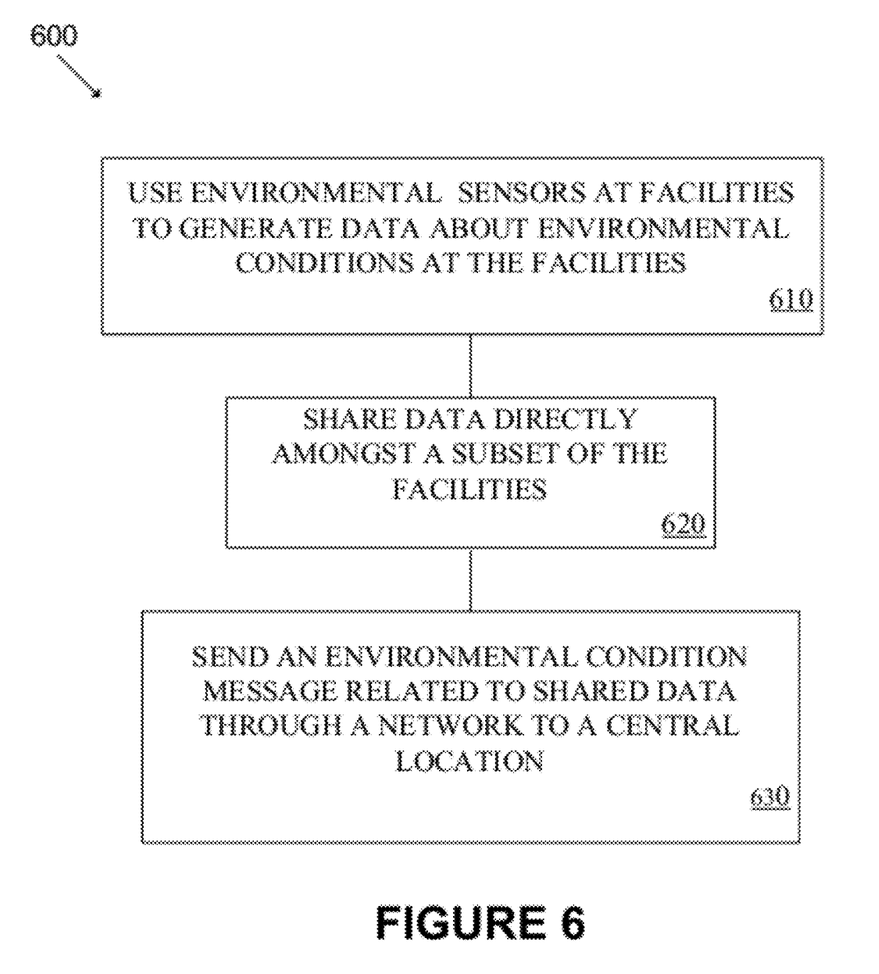
FIG. 6 is a flow diagram illustrating an exemplary method of sharing environmental condition information between facilities connected to one another over a network.

FIG. 6 is a flow diagram illustrating an exemplary method of teaming or otherwise sharing environmental condition information between facilities connected to one another over a network. The method 600 involves using environmental sensors at facilities to generate data about environmental conditions at the facilities, as shown in block 610. The method 600 further involves using a network allowing communication amongst the environmental sensors at the multiple facilities. Specifically, as shown in block 620, the method 600 involves sharing directly, as opposed to using a central processing center for the sharing, amongst a subset of the facilities, as shown in block 620. The subset can include any number or combination of the facilities and may, as examples, include a team of only a first facility and a predetermined number of its closest neighboring facilities or a team of only a first facility and neighboring facilities within a predetermined distance of the first facility.

The method 600 further involves sending an environmental condition message relating to shared data about the environmental condition at the subset of facilities through the network to a central location, as shown in block 630. Such a message may be sent based upon a comparison of the shared data with a profile for a type of environmental occurrence.

Figure 7:
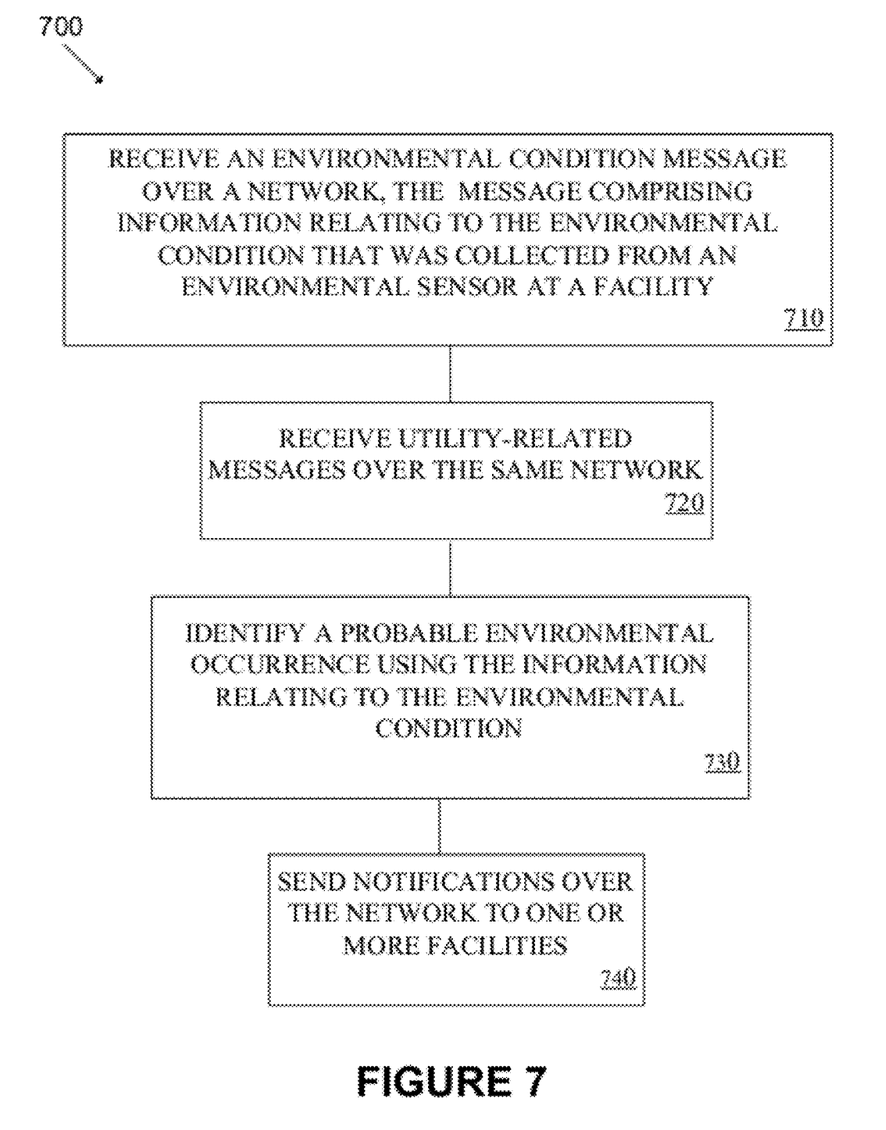
FIG. 7 is a flow diagram illustrating an exemplary method of identifying a probable environmental occurrence using environmental condition data.

FIG. 7 is a flow diagram illustrating an exemplary method 700 of identifying a probable environmental occurrence using environmental condition data. The method 700 involves receiving an environmental condition message over a network, the environmental condition message comprising information relating to the environmental condition that was collected from an environmental sensor at a facility, as shown in block 710. The method 700 further comprises receiving utility-related messages over the same network, as shown in block 720. Such utility messages will generally comprise information relating to measurements from a utility sensor at the facility. The method 700 further comprises identifying a probable environmental occurrence using the information relating to the environmental condition. The method 700 further involves sending notification over the network, as shown in block 740.

In one embodiment, both the environmental condition message and utility message were sent from the facility over a mesh network to a central processing device that identifies the probable environmental occurrence. A central processing device may send notifications to one or more facilities through the mesh network notifying those facilities that the probable environmental occurrence may be occurring or about to occur at those facilities. In response to receiving such notifications, warnings may be provided to one or more facility occupants and/or the measurement, recording, storage, or sending of information relating to the environmental condition, audio, or video at one or more facilities may be initiated or increased.

Identifying the probable environmental occurrence may, in certain embodiments, involve using environmental condition information from facilities at multiple locations and/or also information relating to measurements from one or more utility sensors provided in one or more of the utility related messages. As examples, information relating to measurements from the utility sensors may provide information about a power surge or a power outage. Additionally or alternatively, identifying the probable environmental occurrence may use information from a separate weather service such as information from a radar device relating to weather conditions near the facility.

Information about environmental conditions can be analyzed over time and compared with confirmation of whether a predicted condition did or did not actually occur. Such analysis can be used adjust or otherwise update the profiles that are used to identify future occurrences of the condition.

The methods and systems disclosed herein provide various advantages. Certain embodiments, for example, provide ability to detect weather and other events quicker and, in some circumstances, in near-real time. In certain embodiments, there are advantages to using metering and other dedicated networks having many endpoints. Certain systems provide improved granularity with respect to sensing environmental conditions. Metering systems, for example, may include many devices at relatively close geographic locations. Such granularity can improve the identification of a weather occurrence and its features. For example, more granular pressure data may be used to better understand the past and/or anticipated path of a tornado.

Similarly, such systems may provide an additional perspective for such sensing devices. Thus, in contrast to radar which scans over, across, or down over a landscape, sensing devices implemented in a metering and other dedicated networks having many land-based endpoints can include sensing devices that are located at and/or near ground level and that sense conditions from such vantage points. As a particular example, light sensors can provide information about sunlight, cloud cover, etc. As another particular example, seismic sensing devices may provide improved sensing capabilities given their locations and numbers in a dedicated network having many land-based endpoints.

An alternative embodiment provides a new form of a large scale telescope. Such a telescope can produce an image that is provided by radio or light sensors that are distributed over a large area. It may use inexpensive, low quality sensors that, when used in large numbers dispersed over an area provide information that is not otherwise available.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform or other electronic device, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

The inherent flexibility of network systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel. When data is obtained or accessed as between a first and second system or components thereof, the actual data may travel between the systems directly or indirectly. For example, if a first device accesses data from a second device, the access may involve one or more intermediary devices, proxies, and the like.

The technology referenced herein also makes reference to communicating data between components or systems. It should be appreciated that, unless more specifically identified, such communications may occur over any suitable number or type of networks or links, including, but not limited to, a dial-in network, a local area network (LAN), wide area network (WAN), public switched telephone network (PSTN), a mesh network, an AMI network, a power line carrier network (PLC), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A system comprising:
an environmental sensor, at a facility, generating data about an environmental condition at the facility;
a transmission component, at the facility, sending an environmental condition message to a node of a mesh network, the environmental condition message relating to the data about the environmental condition at the facility, wherein the transmission component sends the environmental condition message responsive to a determination that the generated data about the environmental condition is appropriate to send based at least in part on an environmental occurrence profile; and
wherein the mesh network comprises one or more nodes that receive and route utility measurement messages from facilities, wherein the measurement messages comprise information about measurements from utility sensors at the facilities.

2. The system of claim 1 wherein the message indicates that the data about the environmental condition at the facility satisfies a profile for a type of environmental occurrence.

3. The system of claim 2 wherein a comparison device, at the facility, determines whether the generated data about the environmental condition is appropriate to send.

4. The system of claim 2 wherein the type of environmental occurrence is one of a tornado, a hurricane, an earthquake, a chemical event, a nuclear event, a blizzard, an icing, flooding, volcano, or explosion.

5. The system of claim 2 wherein sending an environmental condition message to a node of a mesh network comprises sending the message through the mesh network to a central processing device, wherein, in response to the message, the central processing device sends notifications to one or more of the facilities through the mesh network notifying that an environmental occurrence may be occurring or about to occur at the one or more of the facilities to which the notifications are sent.

6. The system of claim 2 wherein, in response to receiving one of the notifications, a warning is provided to one or more occupants at the facility.

7. The system of claim 2 wherein the environmental sensor, the transmission component, and the comparison device are all parts of a single utility meter device.

8. A system comprising:
environmental sensors at multiple facilities, each of the environmental sensors generating data about an environmental condition at different ones of the multiple facilities; and
a network allowing communication amongst the environmental sensors at the multiple facilities;
wherein a subset of the environmental sensors share data about the environmental condition at their respective facilities;
wherein an environmental condition message relating to shared data about the environmental condition at the subset of environmental sensors is sent through the network to a central location responsive to a determination that the generated data about the environmental condition is appropriate to send based at least in part on an environmental occurrence profile.

9. The system of claim 8 wherein the environmental condition message is sent based upon a comparison of the shared data with a profile for a type of environmental occurrence.

10. The system of claim 8 wherein the environmental condition message is sent based upon whether the velocity or acceleration of changes to the environmental condition exceed a configurable trigger.

11. The system of claim 8 wherein the subset includes a team of only a first facility and a predetermined number of its closest neighboring facilities.

12. The system of claim 8 wherein the subset includes a team of only a first facility and neighboring facilities within a predetermined distance of the first facility.

13. The system of claim 8 wherein the network is a mesh network of one or more nodes that receive and route utility measurement messages from the multiple facilities, wherein the measurement messages comprise information about measurements from utility sensors at the multiple facilities.

14. The system of claim 13 wherein the environmental condition message has a higher routing priority within the mesh network than the utility measurement messages.

15. A method comprising:
receiving an environmental condition message over a network, the environmental condition message comprising information relating to an environmental condition at a facility, wherein the information relating to the environmental condition was collected from an environmental sensor at a facility, wherein the environmental condition message is received responsive to a determination, at the facility, that the information relating to the environmental condition is appropriate to be received based at least in part on an environmental occurrence profile;
receiving a utility message over the network, the utility message comprising information relating to measurements from a utility sensor at the facility; and
identifying a probable environmental occurrence using the information relating to the environmental condition.

16. The method of claim 15 wherein both the environmental condition message and utility message were sent from the facility over a mesh network to a central processing device that identifies the probable environmental occurrence, wherein the central processing device sends notifications to one or more facilities through the mesh network notifying that the probable environmental occurrence may be occurring or about to occur at the one or more facilities to which the notifications are sent.

17. The method of claim 16 wherein, in response to receiving the notifications:
a warning is provided to one or more facility occupants; and
measurement, recording, storage, or sending of information relating to the environmental condition, audio, or video at one or more facilities is initiated or increased.

18. The method of claim 15 wherein identifying the probable environmental occurrence further involves using environmental condition information from facilities at multiple locations.

19. The method of claim 15 wherein identifying the probable environmental occurrence involves using both the information relating to the environmental condition and the information relating to the measurements from the utility sensor.

20. The method of claim 19 wherein the information relating to the measurements from the utility sensor is information about a power surge or a power outage.

21. The method of claim 15 wherein identifying the probable environmental occurrence comprises using information from a radar device relating to weather conditions near the facility.

22. The method of claim 15 further comprising using the information relating to an environmental condition and a confirmation of whether a predicted occurrence did or did not actually occur to update a profile used to identify future occurrences.

* * * * *